US012393140B2

(12) United States Patent
Hayakawa

(10) Patent No.: US 12,393,140 B2
(45) Date of Patent: Aug. 19, 2025

(54) IMAGE FORMING APPARATUS AND STORAGE MEDIUM

(71) Applicant: Konica Minolta, Inc., Tokyo (JP)

(72) Inventor: Tomoyuki Hayakawa, Akishima (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/667,071

(22) Filed: May 17, 2024

(65) Prior Publication Data

US 2024/0393718 A1 Nov. 28, 2024

(30) Foreign Application Priority Data

May 24, 2023 (JP) ................................ 2023-085294

(51) Int. Cl.
*G03G 15/16* (2006.01)
*G03G 15/00* (2006.01)

(52) U.S. Cl.
CPC ......... *G03G 15/1675* (2013.01); *G03G 15/50* (2013.01); *G03G 15/55* (2013.01); *G03G 15/6529* (2013.01); *G03G 2215/0008* (2013.01); *G03G 2215/00455* (2013.01); *G03G 2215/00599* (2013.01)

(58) Field of Classification Search
CPC ............ G03G 15/164; G03G 15/6517; G03G 15/652; G03G 15/6523; G03G 15/6526; G03G 15/1665; G03G 15/167; G03G 15/1675; G03G 15/50; G03G 15/55; G03G 2215/00455; G03G 2215/00459; G03G 2215/00556; G03G 2215/00599; G03G 2215/00603; G03G 2215/0008
See application file for complete search history.

(56) References Cited

U.S. PATENT DOCUMENTS

2013/0266332 A1* 10/2013 Miyazaki ........... G03G 15/0189 399/66
2016/0299463 A1* 10/2016 Furukawa .......... G03G 15/6529
(Continued)

FOREIGN PATENT DOCUMENTS

JP 2016109699 A 6/2016
JP 2016198971 A 12/2016

*Primary Examiner* — Carla J Therrien
(74) *Attorney, Agent, or Firm* — CANTOR COLBURN LLP

(57) ABSTRACT

Disclosed is an image forming apparatus including: an image former that includes an intermediate transferer, and a secondary transferer to which a transfer bias for secondarily transferring the toner image on the intermediate transferer to a continuous recording medium is applied; a conveyor that is arranged on a downstream side of the image former and conveys the continuous recording medium; and a hardware processor that controls a speed of the intermediate transferer and a speed of the continuous recording medium conveyed by the conveyor. The hardware processor controls a timing at which the transfer bias is applied to the secondary transferer, performs control such that the speed of the continuous recording medium is higher than the speed of the intermediate transferer, and starts application of the transfer bias after the secondary transferer is pressed against the intermediate transferer and before the primary transfer is started.

10 Claims, 4 Drawing Sheets

(56) References Cited

U.S. PATENT DOCUMENTS

| | | | | |
|---|---|---|---|---|
| 2016/0370740 | A1* | 12/2016 | Kobayashi | G03G 15/505 |
| 2018/0088495 | A1* | 3/2018 | Watanabe | G03G 15/161 |
| 2020/0272082 | A1* | 8/2020 | Matsuo | G03G 15/50 |

* cited by examiner

| SECONDARY TRANSFER BIAS ON TIMING | PAPER TYPE | | | ENVIRONMENT | COVERAGE |
|---|---|---|---|---|---|
| | STIFFNESS | FRICTION COEFFICIENT | RESISTANCE VALUE | | |
| EARLIER | HIGH | HIGH | HIGH | LOW TEMPERATURE AND LOW HUMIDITY | LOW |
| LATER | LOW | LOW | LOW | HIGH TEMPERATURE AND HIGH HUMIDITY | HIGH |

IMAGE FORMING APPARATUS AND STORAGE MEDIUM

CROSS REFERENCE TO RELATED APPLICATIONS

The present invention claims priority under 35 U.S.C. § 119 to Japanese Application No. 2023-085294, filed May 24, 2023, the entire contents of which being incorporated herein by reference.

BACKGROUND OF THE INVENTION

Technical Field

The present invention relates to an image forming apparatus and a storage medium.

Description of Related Art

Conventionally, there has been known an image forming apparatus that performs control for suppressing color misregistration, image defect, paper wrinkle, and the like generated in forming an image on continuous paper.

In this regard, the following image forming apparatus is described in Japanese Unexamined Patent Publication No. 2016-198971. Specifically, the apparatus can perform control to start image formation after the meandering of the continuous paper is stabilized after the start of conveyance of the continuous paper. That is, the apparatus can change the run-up distance until the meandering of the continuous sheet is stabilized after the start of the conveyance of the continuous paper.

The following image forming apparatus is described in Japanese Unexamined Patent Publication No. 2016-109699. Specifically, the apparatus suppresses color misregistration by controlling the number of rotations of the fixing roller based on a speed difference between a speed of the intermediate transfer belt and a conveyance speed of a sheet conveyed to the fixing roller. The apparatus performs control such that a fixing speed is faster than a transfer speed.

SUMMARY OF THE INVENTION

The image forming apparatus applies a bias voltage to the transfer roller when the toner image is secondarily transferred to the sheet. An attraction force between the sheet and the intermediate transfer belt changes before and after the bias voltage is applied to the transfer roller.

A case where meandering of the sheet is suppressed by making the fixing speed higher than the transfer speed as in the conventional technology will be described. In this case, when the attraction force between the sheet and the intermediate transfer belt changes as described above, the load applied to the intermediate transfer belt changes. When the load applied to the intermediate transfer belt changes, the speed of the intermediate transfer belt changes, and color misregistration may occur.

When the speed of the intermediate transfer belt changes, the tension applied to the sheet between the transfer section and the fixing section becomes unstable, resulting in unstable conveyance of the sheet. Thus, when the sheet enters the fixing section, paper wrinkles may occur. In a case where the conveyance of the sheet becomes unstable, the sheet to be conveyed undulates and the sheet contacts a belt of the fixing section before the toner image is fixed, so that an image defect generates in some cases.

As described above, in the related art, there is a possibility that the problems of the occurrence of the color misregistration, the image defect, the paper wrinkle, and the like cannot be sufficiently suppressed.

An object of the present invention is to provide an image forming apparatus and a storage medium capable of further suppressing occurrence of color misregistration, image defect, and paper wrinkling in an image forming operation on a continuous recording medium.

To achieve at least one of the abovementioned objects, according to an aspect of the present invention, an image forming apparatus reflecting one aspect of the present invention includes: an image forming apparatus including: an image former that includes an intermediate transferer to which a toner image is primarily transferred to perform primary transfer, and a secondary transferer to which a transfer bias for secondarily transferring the toner image on the intermediate transferer to a continuous recording medium is applied; a conveyor that is arranged on a downstream side of the image former in a conveyance direction of the continuous recording medium and conveys the continuous recording medium; and a hardware processor that controls a speed of the intermediate transferer and a speed of the continuous recording medium conveyed by the conveyor, wherein the hardware processor controls a timing at which the transfer bias is applied to the secondary transferer, performs control such that the speed of the continuous recording medium conveyed by the conveyor is higher than the speed of the intermediate transferer, and starts application of the transfer bias to the secondary transferer after the secondary transferer is pressed against the intermediate transferer and before the primary transfer is started.

To achieve at least one of the abovementioned objects, according to an aspect of the present invention, a storage medium reflecting one aspect of the present invention is a non-transitory storage medium storing a computer readable program for a computer in an image forming apparatus including: an image former that includes an intermediate transferer to which a toner image is primarily transferred to perform primary transfer, and a secondary transferer to which a transfer bias for secondarily transferring the toner image on the intermediate transferer to a continuous recording medium is applied; and a conveyor that is arranged on a downstream side of the image former in a conveyance direction of the continuous recording medium and conveys the continuous recording medium, the program causing the computer to perform controlling that is controlling a speed of the intermediate transferer and a speed of the continuous recording medium conveyed by the conveyor, wherein the program causes the computer to control a timing at which the transfer bias is applied to the secondary transferer, perform control such that the speed of the continuous recording medium conveyed by the conveyor is higher than the speed of the intermediate transferer, and start application of the transfer bias to the secondary transferer after the secondary transferer is pressed against the intermediate transferer and before the primary transfer is started.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, one or more embodiments of the present invention will be described with reference to the drawings. However, the scope of the invention is not limited to the disclosed embodiments.

Structure of an image forming system according to the present embodiment is described below.

(1. Configuration of Image Forming System)

Figure 1:
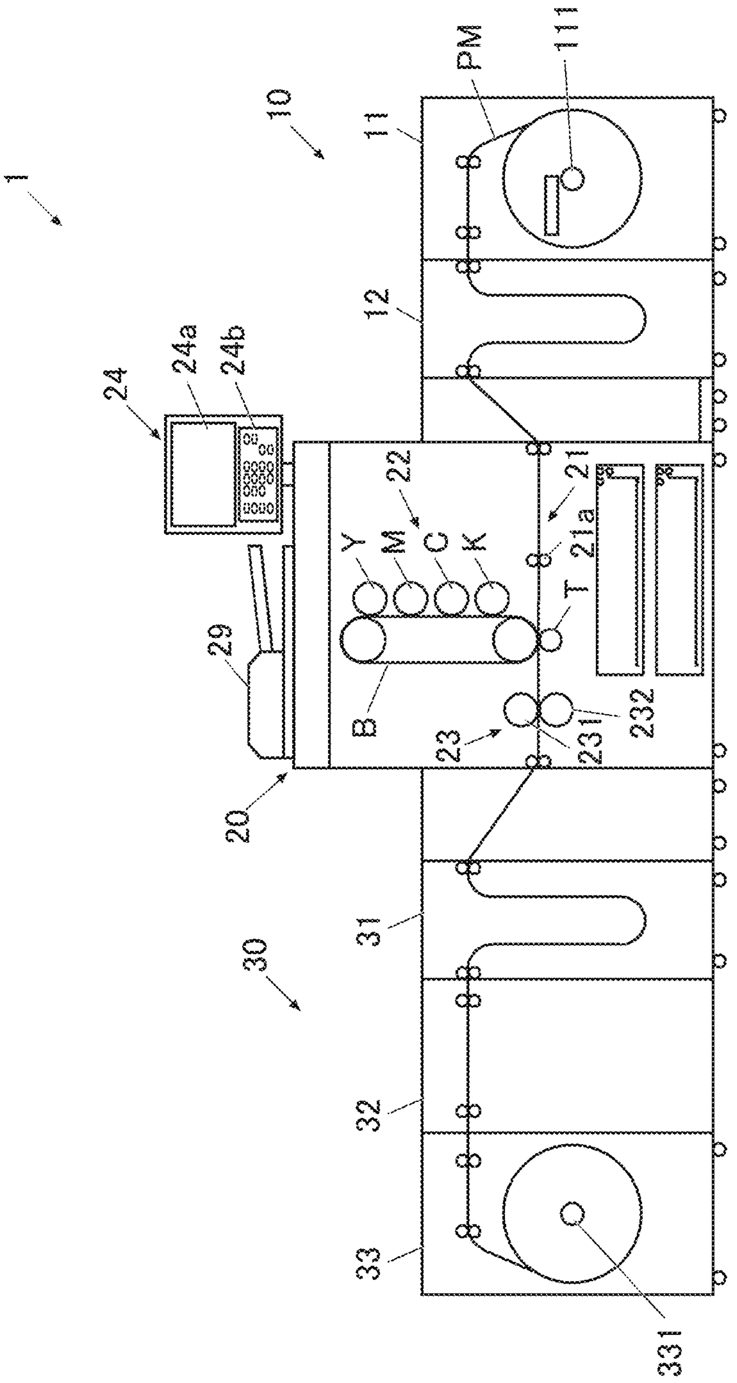
FIG. 1 is a diagram illustrating an example of a schematic configuration of an image forming system in the present invention.
Figure 2:
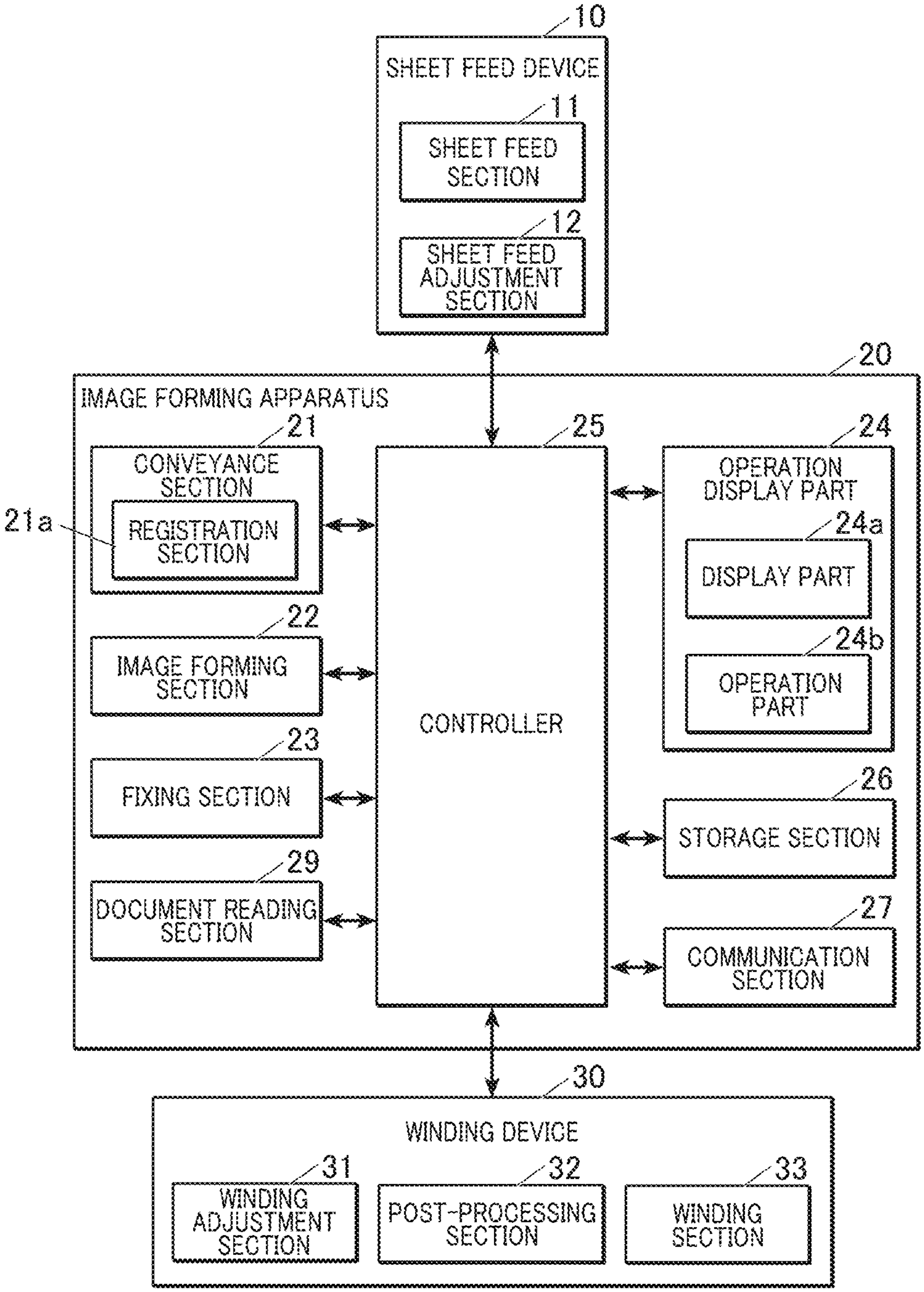
FIG. 2 is a functional block diagram illustrating a control configuration of the image forming system in the present invention.

FIG. 1 is a diagram illustrating an example of a schematic configuration of an image forming system 1. FIG. 2 is a functional block diagram illustrating a control configuration of the image forming system 1.

The image forming system 1 is a system that uses a recording medium PM (continuous recording medium), which is continuous paper such as roll paper or a continuous film, and forms an image on the recording medium PM.

As shown in FIG. 1, the image forming system 1 includes a sheet feed device 10, an image forming apparatus 20, and a winding device 30 from an upstream side along a conveyance direction of a recording medium PM.

(1-1. Configuration of Sheet Feed Device)

The sheet feed device 10 feeds the recording medium PM to the image forming apparatus 20.

The sheet feed device 10 includes a sheet feed section 11 and a sheet feed adjustment section 12.

In the housing of the sheet feed section 11, for example, as illustrated in FIG. 1, the sheet feed section 11 holds a recording medium PM in the form of a roll such that the recording medium PM can be rolled around a support shaft 111. The sheet feed section 11 conveys the recording medium PM wound around the support shaft 111 to the sheet feed adjustment section 12 at a constant speed via a plurality of rollers. The plurality of rollers are, for example, a delivery roller, a paper feed roller, and the like.

Although only one recording medium PM is illustrated in FIG. 1, the sheet feed section 11 may hold a plurality of consecutive recording media.

The sheet feed adjustment section 12 is located downstream of the sheet feed section 11 and upstream of the image forming apparatus 20 in the conveyance direction of the recording medium PM.

The sheet feed adjustment section 12 conveys the recording medium PM conveyed from the sheet feed section 11 to the image forming apparatus 20. The sheet feed adjustment section 12 absorbs a speed difference between a conveyance speed of the recording medium PM in the sheet feed section 11 and a conveyance speed of the recording medium PM in the image forming apparatus 20. Specifically, the sheet feed adjustment section 12 holds the recording medium PM in a slack state as illustrated in FIG. 1, and adjusts the feeding of the recording medium PM to the image forming apparatus 20.

(1-2. Configuration of Image Forming Apparatus)

The image forming apparatus 20 forms an image on the recording medium PM. The image forming apparatus 20 is positioned on the downstream side of the sheet feed adjustment section 12 and on the upstream side of the winding device 30 in the conveyance direction of the recording medium PM.

As illustrated in FIG. 2, the image forming apparatus 20 includes a conveyance section 21, an image forming section 22 (image former), a fixing section 23 serving as a conveyor, an operation display part 24, a controller 25 (i.e., hardware processor), a storage section 26, a communication section 27, and an document reading section 29.

The conveyance section 21 is a conveyance mechanism for the recording medium PM inside the image forming apparatus 20. The conveyance section 21 conveys, for example, with a plurality of rollers, the recording medium PM conveyed from the sheet feed adjustment section 12 to the image forming section 22 and the fixing section 23 in this order, and ejects the recording medium PM.

As illustrated in FIG. 1, the conveyance section 21 includes a registration section 21*a* located on the upstream side of the image forming section 22.

The registration section 21*a* includes registration rollers and conveys the recording medium PM to the transfer section. The transfer section is a nip portion formed by an intermediate transfer belt B and a transfer roller T, which will be described later.

The registration section 21*a* corrects the inclination of the recording medium PM conveyed from the sheet feed device 10 and adjusts the conveyance timing of the recording medium PM.

The image forming section 22 forms a toner image by electrophotography and transfers the toner image onto the recording medium PM.

As illustrated in FIG. 1, the image forming section 22 includes photosensitive drums (Y, M, C, and K) as image bearers, an intermediate transfer belt B as an intermediate transferer, and a transfer roller T as a secondary transferer.

The intermediate transfer belt B is an endless belt. The image forming section 22 winds the intermediate transfer belt B around a plurality of rollers and supports it so that it can run.

The transfer roller T is pressed by the intermediate transfer belt B and is driven to rotate.

The image forming section 22 uniformly charges the photosensitive drums (Y, M, C, and K). Thereafter, the image forming section 22 scans and exposes the photosensitive drum with a laser beam on the basis of image data for each color to form an electrostatic latent image on the photosensitive drum. Next, the image forming section 22 causes toner of each color to adhere to the electrostatic latent image on the photosensitive drum to form a toner image of each color, and sequentially transfers the toner image onto the intermediate transfer belt B (primary transfer). As a result, the image forming section 22 forms a toner image (color image) in which layers of the respective colors (Y, M, C, and K) are superimposed on the intermediate transfer belt B. Next, the image forming section 22 applies a bias (transfer bias) having a polarity opposite to that of the toner to the transfer roller T. Thus, the image forming section 22 transfers the toner images formed on the intermediate transfer belt B onto the recording medium PM (secondary transfer).

The fixing section 23 fixes the toner image secondarily transferred onto the recording medium PM.

As illustrated in FIG. 1, the fixing section 23 includes a pair of rollers, namely, a heating roller 231 and a pressure roller 232, for pinching the recording medium PM therebetween.

The fixing section 23 heats the heating roller 231 to a predetermined temperature by a heater as a heat source.

The fixing section 23 urges the pressure roller 232 toward the heating roller 231 by an unillustrated elastic member.

The fixing section 23 applies heat and pressure to the recording medium PM by passing the recording medium PM, onto which the toner image has been transferred, through a nip part between the heating roller 231 and the pressure roller 232, to thereby fuse and fix the toner image onto the recording medium PM.

The operation display part 24 includes a display part 24*a* and an operation part 24*b*.

The display part 24*a* includes a display screen and displays various kinds of information on the screen.

The operation part 24*b* is used for input of various instructions by a user.

The controller 25 includes, for example, a central processing unit (CPU), a random access memory (RAM), and the like. The CPU of the controller 25 reads various programs such as a system program and a processing program stored in the storage section 26, and loads the programs to the RAM. The CPU of the controller 25 executes various processes in accordance with the expanded program.

For example, the controller 25 controls the communication section 27 to receive a job, image data, and the like transmitted from an external apparatus. The controller 25 controls the image forming section 22 so as to form an image on the recording medium PM based on the received job, image data, and the like.

The storage section 26 includes, for example, a hard disk drive (HDD) and a semiconductor nonvolatile memory.

The storage section 26 stores various programs such as a system program and a processing program to be executed by the controller 25 and data necessary for executing these programs.

The communication section 27 includes a communication control card such as a LAN card. The communication section 27 transmits and receives various types of data to and from an external device connected to a communication network such as a local area network (LAN) or a wide area network (WAN).

The document reading section 29 includes an automatic document feeder (ADF) and an image reading section such as a charge coupled device (CCD).

The document reading section 29 reads an image of a document based on setting information accepted by the operation part 24*b* and generates image date representing the read image. Specifically, the document reading section 29 conveys a document placed on a document tray of the ADF to an exposure glass that is a reading position. Alternatively, the user places the document on the platen glass. Next, the document reading section 29 reads an image on one side or both sides of the document by the image reading section and generates image data thereof.

In the present embodiment, as shown in FIG. 2, the controller 25 integrally controls the entire image forming system 1, but the present invention is not limited thereto. Each of the sheet feed device 10 and the winding device 30 may include a controller.

The image forming apparatus 20 may be a multi-function peripheral (MFP) having, in addition to an image forming function, a copy function, a scan function, a facsimile function, and the like.

(1-3. Configuration of Winding Device)

The winding device 30 is positioned on the downstream side of the image forming apparatus 20 in the conveyance direction of the recording medium PM.

The winding device 30 includes a winding adjustment section 31, a post-processing section 32, and a winding section 33.

The winding adjustment section 31 is located downstream of the image forming apparatus 20 and upstream of the post-processing section 32 in the conveyance direction of the recording medium PM.

The winding adjustment section 31 conveys the recording medium PM conveyed from the image forming apparatus 20 to the post-processing section 32. The winding adjustment section 31 absorbs a speed difference between a conveyance speed of the recording medium PM in the image forming apparatus 20 and a conveyance speed of the recording medium PM in the post-processing section 32. Specifically, the winding adjustment section 31 sags and holds the recording medium PM as illustrated in FIG. 1 and adjusts the ejection of the recording medium PM from the image forming apparatus 20.

The post-processing section 32 is located downstream of the winding adjustment section 31 and upstream of the winding section 33 in the conveyance direction of the recording medium PM.

The post-processing section 32 performs post-processing on the recording medium PM conveyed from the winding adjustment section 31. The post-processing is, for example, cutting, crease processing, perforation processing, creasing, foil stamping, varnish processing, various kinds of bookbinding, curl correction processing, or the like.

In the housing of the winding section 33, for example, as illustrated in FIG. 1, the winding section 33 holds the recording medium PM in a roll shape by winding the recording medium PM around a support shaft 331. The winding section 33 winds the recording medium PM conveyed from the post-processing section 32 around the support shaft 331 at a constant speed via a plurality of rollers. The plurality of rollers are, for example, a pickup roller and a sheet ejection roller.

(2. Operation of Image Forming System)

Next, the operation of the image forming system 1 in the present embodiment will be described.

(2-1. Operation of Applying Tension to Recording Medium)

The image forming apparatus 20 that forms an image by an electrophotographic method performs the following control when conveying the recording medium PM that is a continuous recording medium. Specifically, the tension control is control for applying tension to the recording medium PM in order to perform stable conveyance without a jam by suppressing deviation, meandering, and the like of the recording medium PM.

The controller 25 applies tension to the recording medium PM by performing control such that the more downstream a unit is provided in the conveyance direction of the recording medium PM, the faster the speed of the unit is. To be more specific, controller 25 performs control such that the conveyance speed of recording medium PM by fixing section 23, the speed of intermediate transfer belt B, and the speed of recording medium PM by registration section 21*a* gets higher in this order.

That is, controller 25 controls the speed of intermediate transfer belt B (an intermediate transferer) and the speed of recording medium PM (a continuous recording medium) conveyed by fixing section 23 (a conveyor). The controller 25 functions as a first controller.

Controller 25 serving as the first controller performs control such that the speed of recording medium PM (continuous recording medium) conveyed to fixing section 23 (conveyor) is higher than the speed of intermediate transfer belt B (intermediate transferer).

(2-2. Operation of Setting Meandering Stabilization Distance)

In the image forming system 1, the conveyance of the recording medium PM may not be stable immediately after the start of the conveyance of the recording medium PM, and the recording medium PM may meander. When an image is formed while the recording medium PM is meandering, the quality of the image deteriorates. If the cutting process is performed by the post-processing section 32 while the recording medium PM is meandering, the cutting position is shifted from the original position.

Therefore, when the recording medium PM is used as the target sheet of the print job, the controller 25 conveys the recording medium PM by a predetermined distance before image formation in order to keep the meandering of the recording medium PM within a predetermined allowable range. The predetermined distance is a meandering stabilization distance. Thereafter, the controller 25 starts image formation after the meandering of the recording medium PM falls within a predetermined allowable range and the conveyance of the recording medium PM is stabilized.

Before executing a print job, the controller 25 receives a setting operation of the meandering stabilization distance by the user via the operation part 24*b*.

Figure 3:
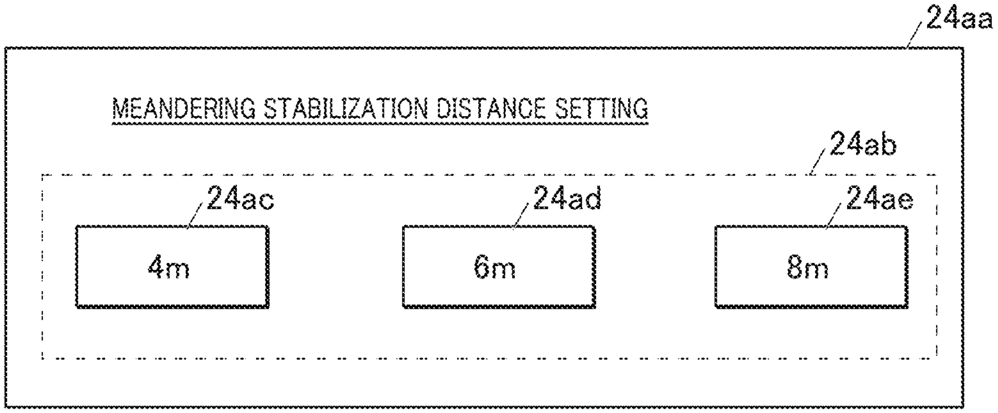
FIG. 3 is a diagram illustrating an example of a setting screen of a meandering stabilization distance.

To be specific, the controller 25 allows the display part 24*a* to display a screen 24*aa* for setting meandering stabilization distances illustrated in FIG. 3.

The controller 25 displays a distance-setting button 24*ab* on the setting screen 24*aa*.

The distance-setting buttons 24*ab* include a "4 m" button 24*ac*, a "6 m" button 24*ad*, and an "8 m" button 24*ae*. The user can select only one of the "4 m" button 24*ac*, the "6 m" button 24*ad*, and the "8 m" button 24*ae*.

The distance-setting button 24*ab* is a button for setting a distance for conveying the recording medium PM to suppress meandering after the image forming system 1 becomes ready for printing. The controller 25 executes the print job after conveying the recording medium PM by the distance.

The meandering stabilization distance set by the distance-setting button 24*ab* is not limited to the example illustrated in FIG. 3.

(2-3. Operation at the Start of Image Formation)

Figures 4, 5:
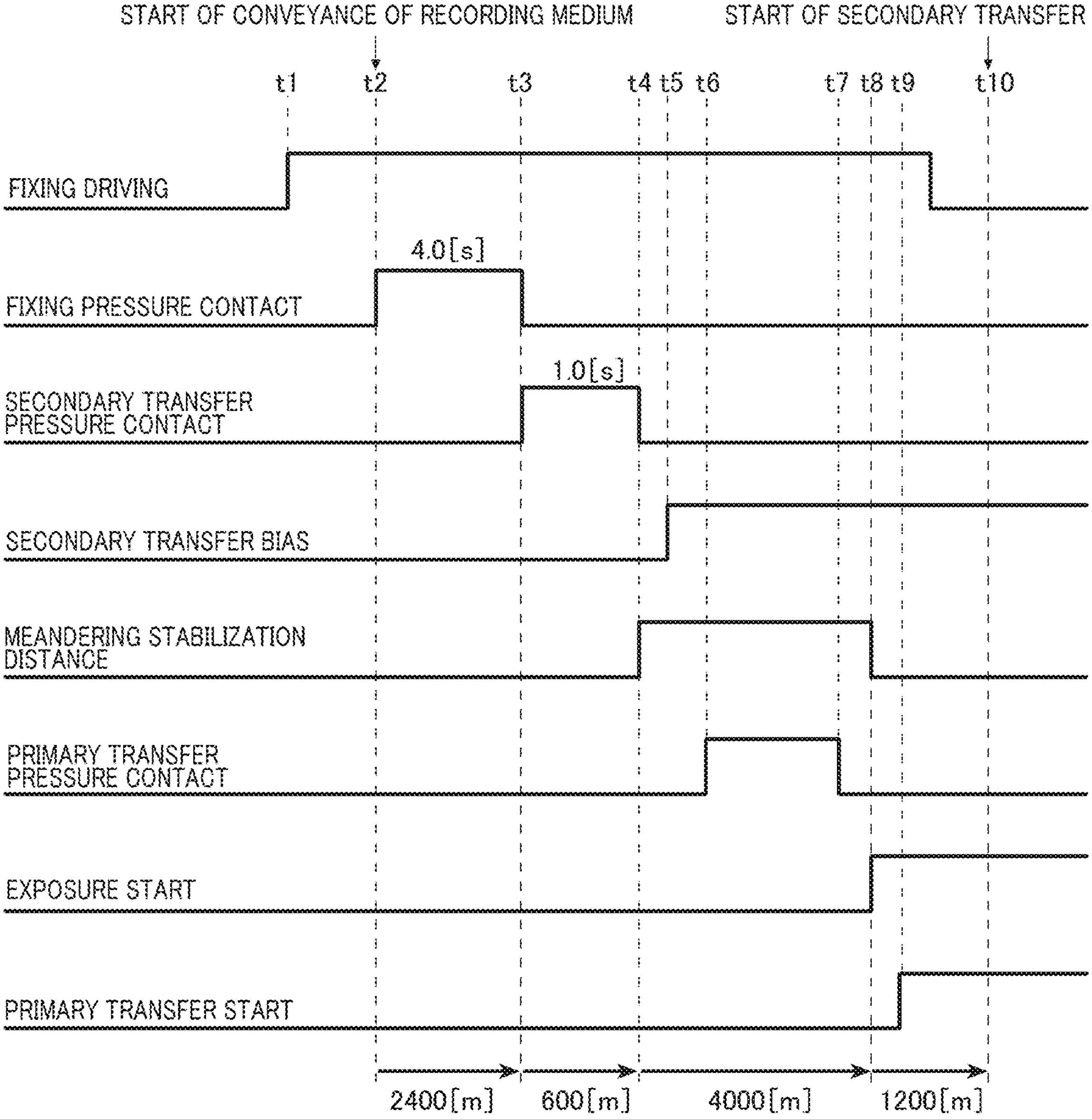
FIG. 4 is a timing chart when image formation is started.
FIG. 5 is a diagram illustrating a timing at which the application of the secondary transfer bias is started.

FIG. 4 is a time chart when image formation is started in the image forming system 1.

At a timing t1, the controller 25 controls the fixing section 23 to start driving the fixing section 23.

At timing t2, controller 25 controls fixing section 23 to start pressure contact (fixing pressure contact) between heating roller 231 and pressure roller 232.

At timing t2, the controller 25 controls the sheet feed device 10 to start conveying the recording medium PM.

At timing t3, the controller 25 controls the fixing section 23 to complete the crimping of the heating roller 231 and the pressure roller 232.

At timing t3, the controller 25 controls the image forming section 22 to start pressure contact of the transfer roller T with the intermediate transfer belt B (secondary transfer pressure contact).

The timings t2 to t3 are, for example, 4.0 sec. The conveyance distance of the recording medium PM between the timings t2 and t3 is, for example, 2400 mm.

At timing t4, the controller 25 controls the image forming section 22 to complete the pressure-contact of the transfer roller T with the intermediate transfer belt B.

At the timing t4, the controller 25 controls the conveyance section 21 to start conveying the recording medium PM by the meandering stabilization distance.

The timings t3 to t4 are, for example, 1.0 sec. The conveyance distance of the recording medium PM between the timings t3 and t4 is, for example, 600 mm.

At timing t5, the controller 25 controls the image forming section 22 to start applying a bias (secondary transfer bias) to the transfer roller T.

At timing t6, the controller 25 controls the image forming section 22 to start pressure contact (primary transfer pressure contact) of the photosensitive drums (Y, M, C, and K) to the intermediate transfer belt B.

At timing t7, the controller 25 controls the image forming section 22 to complete the pressure contact (primary transfer pressure contact) of the photosensitive drums (Y, M, C, and K) to the intermediate transfer belt B.

At the timing t8, the controller 25 controls the conveyance section 21 to complete the conveyance of the recording medium PM by the meandering stabilization distance.

At timing t8, the controller 25 controls the image forming section 22 to start scanning exposure of the photosensitive drum Y with a laser beam.

The conveyance distance of the recording medium PM between timings t4 and t8 is, for example, 4000 mm.

At timing t9, the controller 25 controls the image forming section 22 to start the transfer (primary transfer) of the toner image from the photosensitive drum Y to the intermediate transfer belt B.

At timing t10, the controller 25 controls the image forming section 22 to start transfer (secondary transfer) of the toner image from the intermediate transfer belt B to the recording medium PM.

The conveyance distance of the recording medium PM between the timings t8 and t10 is, for example, 1200 mm.

As described above, the controller 25 controls the timing at which the secondary transfer bias (transfer bias) is applied to the transfer roller T (secondary transferer). The controller 25 functions as a second controller.

Between timings t4 and t9, the controller 25 starts applying a bias (transfer bias) to the transfer roller T. That is, the controller 25 as the second controller starts application of the secondary transfer bias (transfer bias) to the transfer roller T after the transfer roller T (secondary transferer) is pressed against the intermediate transfer belt B (intermediate transferer) (after completion of the secondary transfer pressure contact) and before the primary transfer is started.

The controller 25 starts applying a bias (transfer bias) to the transfer roller T between timings t4 and t8. That is, the controller 25 as the second controller starts application of the secondary transfer bias (transfer bias) to the transfer roller T after the transfer roller T (secondary transferer) is pressed against the intermediate transfer belt B (intermediate transferer) (after completion of the secondary transfer pressure contact) and before exposure of the photosensitive drum (image bearer) by the image forming section 22 is started.

When the secondary transfer bias is applied to the transfer roller T, the speed of the intermediate transfer belt B changes, and the tension to be applied to the recording medium PM becomes unstable.

However, as described above, by starting the application of the secondary transfer bias to the transfer roller T before the primary transfer is started or before the exposure of the photosensitive drum is started, the following effect is obtained.

Specifically, the image forming apparatus 20 can perform the primary transfer and the secondary transfer after the elapse of a predetermined time from the start of the application of the secondary transfer bias to the transfer roller T by the image forming apparatus 20. The state after the predetermined time has elapsed is a state in which the speed of the intermediate transfer belt B is stable. Thus, color misregistration and image defect can be suppressed in the image forming operation on the recording medium PM that is a continuous recording medium.

The image forming apparatus 20 can perform the secondary transfer in a state where the conveyance speed of the recording medium PM and the tension to be applied to the recording medium PM are stable. Accordingly, it is possible to suppress the image defect by suppressing the paper wrinkle and the waving of the recording medium PM which is the continuous recording medium.

The controller 25 starts applying a bias (transfer bias) to the transfer roller T between timings t4 and t8. That is, after starting conveyance of the recording medium PM (continuous recording medium) and before starting printing, the controller 25 as the second controller starts application of the secondary transfer bias (transfer bias) to the transfer roller T (secondary transferer) while the recording medium PM (continuous recording medium) is being conveyed by the meandering stabilization distance (predetermined distance).

The recording medium PM conveyed during the conveyance of the recording medium PM by the meandering stabilization distance becomes waste sheet. The recording medium PM conveyed while the speed of the intermediate transfer belt B, the conveyance speed of the recording medium PM, and the tension applied to the recording medium PM are stabilized becomes waste sheet.

However, as described above, the following effects can be obtained by starting the application of the secondary transfer bias to the transfer roller T while the recording medium PM is being conveyed by the meandering stabilization distance. Specifically, it is possible to reduce waste sheet that occurs before the start of printing.

It is preferable that the timings t4 to t5 are within 1.0 sec.

That is, the controller 25 as the second controller starts to apply the secondary transfer bias (transfer bias) to the transfer roller T immediately after the transfer roller T (secondary transferer) is pressed against the intermediate transfer belt B (intermediate transferer) (immediately after the completion of the secondary transfer pressure contact).

Thus, the image forming apparatus 20 can secure the longest time for stabilizing the speed of the intermediate transfer belt B, the conveyance speed of the recording medium PM, and the tension to be applied to the recording medium PM. Therefore, it is possible to further stabilize the speed of the intermediate transfer belt B, the conveyance speed of the recording medium PM, and the tension applied to the recording medium PM. Therefore, it is possible to further reduce waste sheet generated due to image defect.

The controller 25 applies a bias of the voltage 1000 V to the transfer roller T at the start of application of the bias to the transfer roller T (timing t5). Thereafter, the controller 25 gradually increases the voltage of the bias applied to the transfer roller T to 2000 V by timing t9.

The voltage value of the bias to be applied to the transfer roller T is not limited to the above example. The voltage value may be a value corresponding to an environmental condition in the image forming apparatus 20.

That is, the controller 25 as the second controller applies the second voltage (e.g., 1000 V) lower than the first voltage (e.g., 2000 V) as the secondary transfer bias at the timing of starting the application of the secondary transfer bias (transfer bias) to the transfer roller T (secondary transferer). The controller 25 as a second controller applies a first voltage (e.g., 2000 V) as the secondary transfer bias at a timing when the primary transfer is started.

Applying the secondary transfer bias having the smaller voltage value at the timing of starting the application of the secondary transfer bias to the transfer roller T produces the following effects. Specifically, it is possible to suppress a rapid change in the load applied to the intermediate transfer belt B. As a result, it is possible to shorten the time for stabilizing the speed of the intermediate transfer belt B, the conveyance speed of the recording medium PM, and the tension applied to the recording medium PM.

Controller 25 sets the transfer speed for recording medium PM to −0.2% of the reference speed at the start of application of the bias to transfer roller T (timing t5). The reference speed is a speed that is determined in advance according to a paper type or the like and is a speed defined as a system speed of the image forming apparatus 20. The reference speed is, for example, 600 mm/sec. Thereafter, the controller 25 gradually returns the setting of the transfer speed onto the recording medium PM to the reference speed by timing t9.

That is, the controller 25 as the first controller serves as the second controller to make the speed of the intermediate transfer belt B (intermediate transferer) slower than the reference speed at the timing when the application of the secondary transfer bias (transfer bias) to the transfer roller T (secondary transferer) is started.

The following effects are obtained by making the speed of the intermediate transfer belt B slower than the reference speed at the timing of starting the application of the secondary transfer bias to the transfer roller T. Specifically, a rapid change in the speed of the intermediate transfer belt B can be suppressed. As a result, it is possible to shorten the time for stabilizing the speed of the intermediate transfer belt B, the conveyance speed of the recording medium PM, and the tension applied to the recording medium PM.

A load applied to intermediate transfer belt B when the toner image is secondarily transferred to recording medium PM changes according to the following conditions. Specifically, the condition is a paper type of the recording medium PM, an environmental condition in the image forming apparatus 20, coverage of a job image of the print job, or the like.

Therefore, after the timing t4, the controller 25 changes the timing (timing t5) at which the secondary transfer bias is applied to the transfer roller T in accordance with the above-described condition. To be specific, the controller 25 changes the timing t5 in accordance with the paper type of the recording medium PM, the environmental conditions inside the image forming apparatus 20, or the coverage of the job image of the print job.

FIG. 5 shows an example of the timing at which the application of the secondary transfer bias is started.

As illustrated in FIG. 5, when the stiffness of the recording medium PM is higher than a predetermined value, the controller 25 makes the timing at which the application of the secondary transfer bias is started earlier than a predetermined reference timing.

When the stiffness of the recording medium PM is equal to or less than a predetermined value, the controller 25 makes the timing at which the application of the secondary transfer bias is started later than a predetermined reference timing.

In a case where the friction coefficient of the recording medium PM is higher than a predetermined value, the controller 25 makes the timing of starting the application of the secondary transfer bias earlier than a predetermined reference timing.

If the coefficient of friction of the recording medium PM is less than or equal to a predetermined value, the controller 25 makes the timing at which to start applying the secondary transfer bias later than a predetermined reference timing.

When the resistance value of the recording medium PM is higher than a predetermined value, the controller 25 makes the timing to start the application of the secondary transfer bias earlier than a predetermined reference timing.

When the resistance value of the recording medium PM is equal to or less than a predetermined value, the controller 25 makes the timing of starting the application of the secondary transfer bias later than a predetermined reference timing.

That is, the controller 25 as a second controller starts application of the secondary transfer bias (transfer bias) to the transfer roller T (secondary transferer) at a timing corresponding to the paper type of the recording medium PM (continuous recording medium).

As shown in FIG. 5, in the case where the environmental condition in the image forming apparatus 20 is low temperature and low humidity, the controller 25 makes the timing for starting the application of the secondary transfer bias earlier than a predetermined reference timing.

In a case where the environmental condition in the image forming apparatus 20 is hot and humid, the controller 25 makes the timing at which the application of the secondary transfer bias is started later than a predetermined reference timing.

That is, the controller 25 as a second controller starts application of the secondary transfer bias (transfer bias) to the transfer roller T (secondary transferer) at a timing depending on an environmental condition in the image forming apparatus 20.

As shown in FIG. 5, when the coverage of the job image is lower than a predetermined value, the controller 25 makes the timing of starting the application of the secondary transfer bias earlier than a predetermined reference timing.

When the coverage of the job image is a predetermined value or more, the controller 25 makes the timing at which the application of the secondary transfer bias is started later than a predetermined reference timing.

That is, the controller 25 as the second controller starts application of the secondary transfer bias (transfer bias) to the transfer roller T (secondary transferer) at a timing depending on the coverage of the job image.

As described above, the image forming apparatus 20 according to the present embodiment includes the image forming section 22 including the intermediate transferer (intermediate transfer belt B) to which the toner images are primarily transferred, and the secondary transferer (transfer roller T) to which a transfer bias (secondary transfer bias) for secondarily transferring the toner images on the intermediate transferer to the continuous recording medium (recording medium PM) is applied.

The image forming apparatus 20 according to the present embodiment includes a conveyor (fixing section 23) that is disposed downstream from the image forming section 22 in the conveyance direction of the continuous recording medium and conveys the continuous recording medium.

The image forming apparatus 20 according to the present embodiment includes a first controller (controller 25) that controls the speed of the intermediate transferer and the speed of the continuous recording medium conveyed by the conveyor.

The image forming apparatus 20 according to the present embodiment includes the second controller (controller 25) that controls the timing of applying the transfer bias to the secondary transferer.

The first controller performs control such that the speed of the continuous recording medium conveyed by the conveyor is higher than the speed of the intermediate transferer.

The second controller starts applying the transfer bias to the secondary transferer after the secondary transferer is pressed against the intermediate transferer and before the primary transfer is started.

In the image forming apparatus 20 according to the present embodiment, the image forming section 22 includes an image bearer (photosensitive drum) that bears toner.

The second controller (controller 25) starts applying the transfer bias (secondary transfer bias) to the secondary transferer (fixing section 23) after the secondary transferer is pressed against the intermediate transferer (intermediate transfer belt B) and before the exposure of the image bearers by the image forming section 22 is started.

Thus, after a predetermined time has elapsed since the start of application of the secondary transfer bias to the transfer roller T by the image forming apparatus 20, the image forming apparatus 20 can perform the primary transfer and the secondary transfer. The state after the lapse of the predetermined time by advancing the timing of starting the application of the secondary transfer bias as compared with the conventional case is a state in which the speed of the intermediate transfer belt B is more stable as compared with the conventional case. Thus, color misregistration and image defect can be further suppressed in the image forming operation on the recording medium PM, which is a continuous recording medium.

The image forming apparatus 20 can perform the secondary transfer in a state where the conveyance speed of the recording medium PM and the tension to be applied to the recording medium PM are more stable than ever. Accordingly, it is possible to further suppress the image defect by suppressing the paper wrinkle and the waving of the recording medium PM which is the continuous recording medium.

In the image forming apparatus 20 according to the present embodiment, the second controller (controller 25) starts applying the transfer bias (secondary transfer bias) to the secondary transferer (transfer roller T) while the continuous recording medium (recording medium PM) is being conveyed by a predetermined distance (meandering stabilization distance) after the start of conveyance of the continuous recording medium and before the start of printing.

Therefore, it is possible to reduce waste sheets generated before the start of printing.

In the image forming apparatus 20 according to the present embodiment, the second controller (controller 25) starts applying the transfer bias (secondary transfer bias) to the secondary transferer (transfer roller T) immediately after the secondary transferer is pressed against the intermediate transferer (intermediate transfer belt B).

Thus, the image forming apparatus 20 can secure the longest time for stabilizing the speed of the intermediate transfer belt B, the conveyance speed of the recording medium PM, and the tension to be applied to the recording medium PM. Therefore, it is possible to further stabilize the speed of the intermediate transfer belt B, the conveyance speed of the recording medium PM, and the tension applied to the recording medium PM. Therefore, it is possible to further reduce waste sheet generated due to image defect.

In the image forming apparatus 20 according to the present embodiment, the second controller (controller 25) applies the second voltage lower than the first voltage as the transfer bias at the timing of starting the application of the transfer bias (secondary transfer bias) to the secondary transferer (transfer roller T). The second controller applies a first voltage as the transfer bias at a timing when the primary transfer is started.

Therefore, it is possible to suppress a rapid change in the load applied to the intermediate transfer belt B. As a result, it is possible to shorten the time for stabilizing the speed of the intermediate transfer belt B, the conveyance speed of the recording medium PM, and the tension applied to the recording medium PM.

In the image forming apparatus 20 according to the present embodiment, the first controller (controller 25) makes the speed of the intermediate transferer (intermediate transfer belt B) slower than a reference speed at the timing when the second controller (controller 25) starts applying the transfer bias (secondary transfer bias) to the secondary transferer (transfer roller T).

Therefore, a rapid change in the speed of the intermediate transfer belt B can be suppressed. As a result, it is possible to shorten the time for stabilizing the speed of the intermediate transfer belt B, the conveyance speed of the recording medium PM, and the tension applied to the recording medium PM.

In the image forming apparatus 20 according to the present embodiment, the second controller (controller 25) starts applying the transfer bias (secondary transfer bias) to the secondary transferer (transfer roller T) at a timing corresponding to the paper type of the continuous recording medium (recording medium PM).

Therefore, the application of the secondary transfer bias to the transfer roller T can be started at an optimum timing corresponding to the paper type of the recording medium PM.

In the image forming apparatus 20 according to the present embodiment, the second controller (controller 25) starts applying the transfer bias (secondary transfer bias) to the secondary transferer (transfer roller T) at a timing corresponding to an environmental condition in the image forming apparatus 20.

Therefore, the application of the secondary transfer bias to the transfer roller T can be started at an optimum timing corresponding to the environmental condition in the image forming apparatus 20.

In the image forming apparatus 20 according to the present embodiment, the second controller (controller 25) starts application of the transfer bias (secondary transfer bias) to the secondary transferer (transfer roller T) at a timing corresponding to the coverage of the job image.

Therefore, the application of the secondary transfer bias to the transfer roller T can be started at an optimum timing corresponding to the coverage of the job image.

Note that embodiments to which the present invention can be applied are not limited to those described above and can be appropriately modified without departing from the spirit and scope of the present invention.

For example, although the controller 25 functions as the first controller and the second controller in the above embodiment, it is not limited thereto. In a case where any of the apparatuses other than the image forming apparatus 20 included in the image forming system 1 includes a controller, the controller may function as the first controller and the second controller.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:

an image former that includes an intermediate transferer to which a toner image is primarily transferred to perform primary transfer, and a secondary transferer to which a transfer bias for secondarily transferring the toner image on the intermediate transferer to a continuous recording medium is applied;

a conveyor that is arranged on a downstream side of the image former in a conveyance direction of the continuous recording medium and conveys the continuous recording medium; and a hardware processor that controls a speed of the intermediate transferer and a speed of the continuous recording medium conveyed by the conveyor, wherein the hardware processor controls a timing at which the transfer bias is applied to the secondary transferer, performs control such that the speed of the continuous recording medium conveyed by the conveyor is higher than the speed of the intermediate transferer, and starts application of the transfer bias to the secondary transferer after the secondary transferer is pressed against the intermediate transferer and before the primary transfer is started.

2. The image forming apparatus according to claim 1, wherein the image former includes an image bearer that carries toner, and the hardware processor starts the application of the transfer bias to the secondary transferer after the secondary transferer is pressed against the intermediate transferer and before exposure of the image bearer by the image former is started.

3. The image forming apparatus according to claim 1, wherein the hardware processor starts the application of the transfer bias to the secondary transferer while the continuous recording medium is conveyed by a predetermined distance after start of conveyance of the continuous recording medium and before start of printing.

4. The image forming apparatus according to claim 1, wherein the hardware processor starts the application of the transfer bias to the secondary transferer immediately after the secondary transferer is pressed against the intermediate transferer.

5. The image forming apparatus according to claim 1, wherein the hardware processor applies a second voltage smaller than a first voltage as the transfer bias at a timing at which the application of the transfer bias to the secondary transferer is started and applies the first voltage as the transfer bias at a timing at which the primary transfer is started.

6. The image forming apparatus according to claim 1, wherein the hardware processor makes the speed of the intermediate transferer slower than a reference speed at a timing at which the application of the transfer bias to the secondary transferer is started.

7. The image forming apparatus according to claim 1, wherein the hardware processor starts the application of the transfer bias to the secondary transferer at a timing corresponding to a paper type of the continuous recording medium.

8. The image forming apparatus according to claim 1, wherein the hardware processor starts the application of the transfer bias to the secondary transferer at a timing corresponding to an environmental condition in the image forming apparatus.

9. The image forming apparatus according to claim 1, wherein the hardware processor starts the application of the transfer bias to the secondary transferer at a timing corresponding to coverage of a job image.

10. A non-transitory storage medium storing a computer readable program for a computer in an image forming apparatus including: an image former that includes an intermediate transferer to which a toner image is primarily transferred to perform primary transfer, and a secondary transferer to which a transfer bias for secondarily transferring the toner image on the intermediate transferer to a continuous recording medium is applied; and a conveyor that is arranged on a downstream side of the image former in a conveyance direction of the continuous recording medium and conveys the continuous recording medium, the program causing the computer to perform controlling that is controlling a speed of the intermediate transferer and a speed of the continuous recording medium conveyed by the conveyor, wherein the program causes the computer to control a timing at which the transfer bias is applied to the secondary transferer, perform control such that the speed of the continuous recording medium conveyed by the conveyor is higher than the speed of the intermediate transferer, and start application of the transfer bias to the secondary transferer after the secondary transferer is pressed against the intermediate transferer and before the primary transfer is started.

* * * * *